May 13, 1952        T. C. HILL        2,596,242

VARIABLE RATIO BOOSTER CONTROL SYSTEM

Filed May 12, 1949        2 SHEETS—SHEET 1

Inventor
THOMAS C. HILL,

By Martin E. Hogan Jr.

ATTORNEY

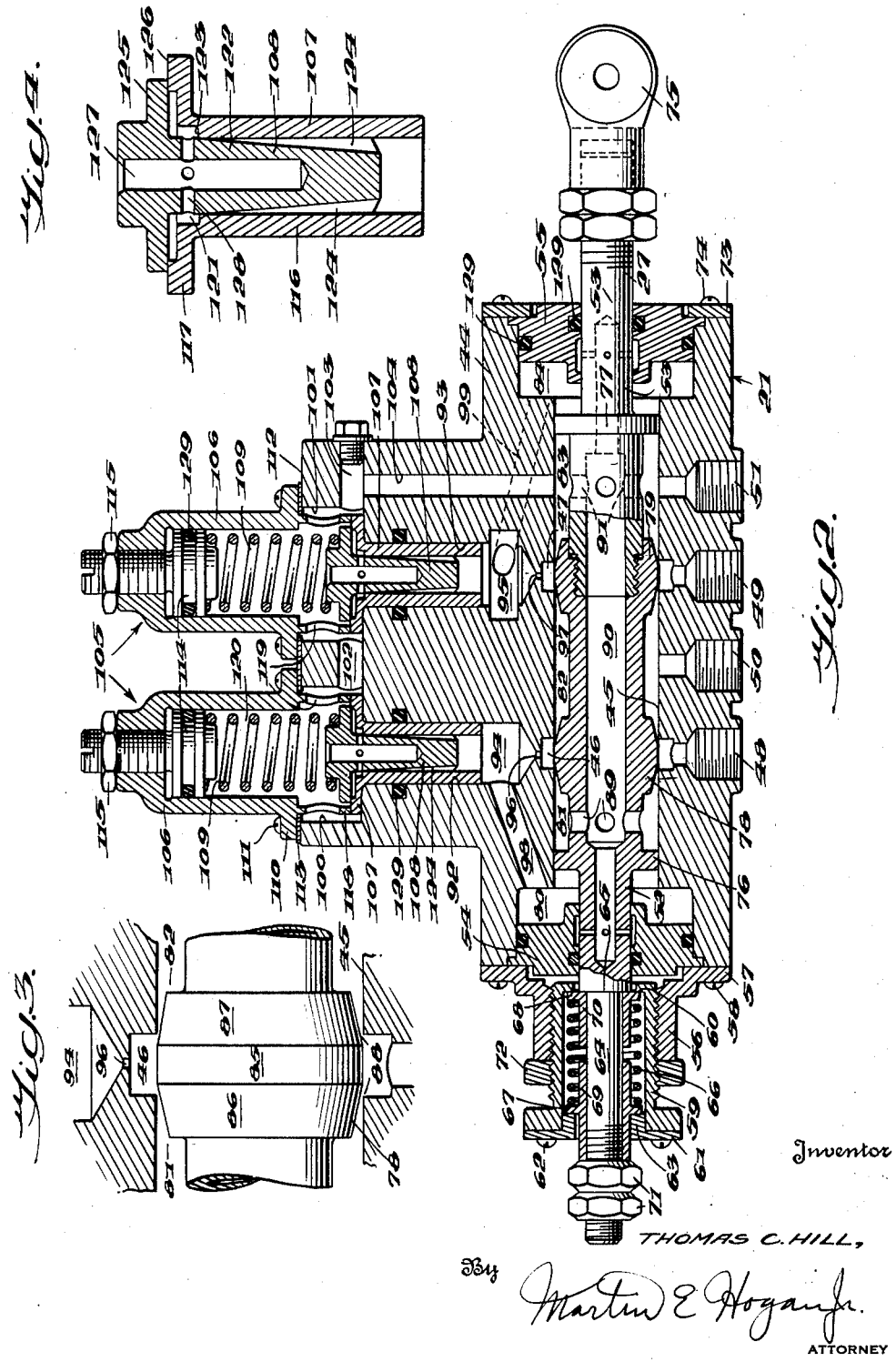

Patented May 13, 1952

2,596,242

UNITED STATES PATENT OFFICE 2,596,242

VARIABLE RATIO BOOSTER CONTROL SYSTEM

Thomas C. Hill, Aberdeen, Md., assignor to The Glenn L. Martin Company, Middle River, Md., a corporation of Maryland Application May 12, 1949, Serial No. 92,834

11 Claims. (Cl. 121—41)

This application relates to an improved booster control system especially intended for the control of aircraft.

In modern aircraft, the force necessary to operate the control surfaces has become so great that it has become customary to provide a power booster for supplying the major portion of this force. In such systems, it is usual to have the power boost mechanism also apply a much smaller force resisting movement of the manual control means, which force is directly proportional to the total force needed to operate the control surface. Thus the pilot effort will vary substantially directly as the loads on the control surface, the ratio of this pilot effort, or "feel," as it is termed in the art, to the actual control force being constant.

It is found, however, that such a constant ratio booster system is not satisfactory when the control of extremely high speed aircraft is involved. With such a plane, if the "feel" ratio is adjusted to give a desired degree of pilot effort when the plane is moving at relatively low speed such as during landing operations, the pilot effort required to operate the controls at extremely high speeds becomes excessive. On the other hand, if the feel ratio is adjusted to give the desired maximum pilot effort at high speed, the degree of effort required at low speeds becomes so small that the pilot loses practically all sense of feel with the resulting danger of stalling the aircraft.

It is therefore an object of this invention to provide a booster control system for aircraft which will automatically apply a relatively large percentage of "feel" to the manual control means at low values of load on the control surfaces while applying a lower percentage of feel at high loads.

It is a further object to provide such a booster control system wherein the ratio of feel to control load will vary smoothly between the maximum and minimum values as above set forth and yet wherein an increase in load on the controls will always produce an accompanying increase in feel at the manual control means.

Another object is to provide a booster control valve readily applicable to existing booster control systems which will automatically vary the boost or feel characteristics as set forth in the preceding objects.

A further object is to provide such a control valve wherein the feel reaction applied to the manual control means is proportional to the pressure existing at any particular time in a feel chamber of said valve, said feel chamber being connected to the booster cylinder by means including a pressure reducing means and wherein pressure control means are provided for causing the pressure drop through said pressure reducing means to vary in accordance with a change in pressure in the feel chamber.

A still further object is to provide such a control valve wherein the pressure control means may be preloaded so as to prevent any pressure drop through said pressure reducing means until the pressure in said feel chamber reaches a predetermined value and thereafter to cause a pressure drop therethrough which increases smoothly with an increase in feel pressure above said predetermined value.

Another object is to provide a booster control valve of the above type wherein the pressure reducing means comprises a fixed restricted orifice and wherein the pressure control means comprises a variable orifice valve controlling the discharge of pressure fluid from said feel chamber, said variable orifice valve being arranged to automatically vary the area of its discharge orifice in accordance with the pressure within said feel chamber.

Other and further objects will become obvious from a study of the following description and of the appended claims in view of the accompanying drawings wherein:

Figure 1 is a diagrammatic showing of the improved booster control system arranged for actuating a control surface on an aircraft.

Figure 2 is a longitudinal sectional view through the control valve shown in Figure 1.

Figure 3 is an enlarged fragmentary sectional view of a detail of Figure 2.

Figure 4 is an enlarged sectional view of one of the variable orifice valves together with its seat.

In Figure 1 of the drawing, there is shown diagrammatically a booster control system employing the present invention. A control surface 10 shown as an elevator, but which might be any other control surface such as a rudder or an aileron, is pivoted at 11 to the airplane and is adapted to be swung about said pivot by lever arm 12 rigid therewith. Booster control cylinder 13 having a piston rod 14 is pivotally connected to arm 12 by means of link 16 pivoted to the piston rod at 15 and to the arm 12 at 17. Fluid under pressure is adapted to be supplied selectively to either end of said booster cylinder by means of a pump 18 which draws fluid from a reservoir 19 and discharges it through pressure line 20 leading to the booster control valve 21 by which it is distributed to either conduit 22 or 23 leading to opposite ends of the booster cylinder. The exhaust fluid is returned from the valve 21 to the reservoir through exhaust line 24. The usual pressure relief valve 25 is arranged in a conduit 26 connected between pressure line 20 and exhaust line 24.

The valve 21 includes a control plunger 27 pivoted at 28 to a link 29 which is in turn pivoted at 30 to the lower end of a lever 31. This lever 31 is centrally pivoted as at 32 to another lever 33, this latter lever being pivotally mounted at 34 by brackets 35 rigidly carried by the aircraft. As clearly shown, pivot 32 is so located on lever 33 that pivots 30 and 34 are in alignment when the control valve plunger is in neutral position. Lever 33 is connected by control cables 36 attached to the opposite ends thereof as at 37, and having their opposite ends attached as at 38 to a manual control means 39 pivotally mounted at 40 in the aircraft. A follower link 41 is pivotally connected to the control arm 12 at 42 and to the upper end of lever 31 at 43.

The booster control valve itself consists of a body 44 having a longitudinal bore 45 extending therethrough, said bore including enlarged cylinder chambers 46 and 47. Said chambers communicate by means of cylinder ports 48 and 49 with the conduits 22 and 23 leading to opposite ends of the booster cylinder so that the pressure in these chambers will correspond to the pressure within the corresponding ends of the cylinder. Communicating with bore 45 between these cylinder ports is a pressure port 50 adapted to receive the pressure line 20, while an exhaust port 51 is arranged to the right of port 49 and is adapted to be connected to exhaust line 24.

Mounted for reciprocation within the bore is a valve spool or plunger 27. This plunger includes at the opposite ends thereof, stem portions 52 and 53 which extend through end caps 54 and 55 in liquid-tight relation thereto. Acting on the left-hand stem 52 is a centering means including an internally threaded cylindrical member 56 having its flange 57 attached to the valve body 44 as at 58. This cylindrical member serves also to retain cap 54 in position. An adjusting barrel 59 is threaded into member 56 and includes at its inner end inturned flange 60. Attached at 62 to the outer end of member 59 is a retaining ring 61 forming another flange 63. The outer end of stem 52 is reduced in diameter as at 64 to form a shoulder 65. A centering spring 66 acts between flanges 67 and 68 on sleeves 69 and 70 slidably mounted on portion 64 of the stem and normally holding these sleeves against the inturned flanges 60 and 63. The outer end of stem 52 has nuts 71 threaded thereon so as to abut against the outer end of sleeve 69. These nuts are so adjusted as to draw shoulder 65 against flange 68 of sleeve 70.

With the above arrangement, it can be seen that the centering spring will always tend to return the valve spool to its neutral position shown in Figure 2. By screwing barrel 59 into or out of member 56, the neutral position of the spool may be varied to assume its proper position relative to the various ports. Lock nut 72 serves to hold the barrel in adjusted position. Displacement of the plunger in either direction from neutral position will be limited by the engagement of the adjacent ends of sleeves 69 and 70.

Cap 55 at the opposite end of the valve body is retained in place by retaining ring 73 attached at 74 to the valve body. Stem 53 terminates in an adjustable clevis 75 adapted to be connected by pivot 28 to the actuating link 29 shown in Figure 1.

Spool 27 includes end enlargements or lands 76 and 77 and intermediate lands 78 and 79, the latter being normally centered opposite the corresponding cylinder chambers 46 and 47. In conjunction with the valve bore and the end caps, these lands form valve chambers which will hereafter be designated as follows:

The chamber formed between end cap 54 and land 76 constitutes the left-hand feel chamber 80; that between the land 76 and land 78 constitutes the left-hand exhaust chamber 81; that between the lands 78 and 79 constitutes the pressure chamber 82; that between the lands 79 and 77 constitutes the right-hand exhaust chamber 83; and that between land 77 and end cap 55 constitutes the right-hand feel chamber 84.

The lands 78 and 79 are of similar contour and are best illustrated in Figure 3. These lands include a central cylindrical surface 85 of a diameter to form a sliding fit with bore 45 and also include conical end portions 86 and 87. The width of portion 85 axially of the spool is less than the axial width of the associated cylinder chamber 46 or 47 so that when the valve spool is in neutral position, peripheral passages 88 are formed between the conical surfaces of the lands and the side walls of the cylinder chambers, thus connecting the cylinder chambers 46 and 47 with the pressure chamber 82 and with the exhaust chambers 81 and 83. Exhaust chamber 81 is connected to exhaust chamber 83 by internal passages 89, 90, and 91 in the spool as clearly shown in Figure 2.

Extending downwardly from the top of body 44, in line with the chambers 46 and 47, are two bores 92 and 93 forming at their lower ends, chambers 94 and 95 which communicate with feel chambers 80 and 84 by passages 98 and 99 respectively. These chambers 95 and 94 constitute in effect, therefore, portions of the feel chambers. The lower ends of these bores are connected by restricted orifices 96 and 97 with the corresponding cylinder chambers 46 and 47.

The upper ends of bores 92 and 93 terminate in larger chambers 100 and 101 connected together by passageway 102 and connected to the exhaust chamber 83 by passageways 103 and 104. Communication between the chambers 94 and 95 and their corresponding chambers 100 and 101 and hence with the exhaust chamber 83 is under the control of variable orifice pressure control valve units 105 of identical construction.

Each of these pressure control valve units includes a housing 106, a valve seat 107, and a valve 108, urged against the seat by a pressure spring 109. The housing 106 includes an outstanding flange 110 adapted to be secured to the upper face 112 of the body as at 111, thus closing the upper ends of the corresponding chambers 100 or 101. Sealing gasket 113 is provided between flange 110 and surface 112 of the body to insure against leakage of fluid. Threaded through the top of housing 106 is an adjusting plunger 114 which engages the upper end of spring 109 to adjust the loading thereof. Nut 115 is provided to lock the plunger in adjusted position.

Seat 107 includes a hollow cylindrical portion extending into the corresponding bore 92 or 93 and an upper circular flange 117 resting against the lower end of the associated chamber 100 or 101 and held thereagainst by the lower end portion 118 of the wall of housing 106 as clearly shown in Figure 2. Openings 119 are provided in these lower wall portions 118 to provide for free flow of fluid from the hollow interior 120 of the housing into the chamber 100 or 101 as the case may be.

As best shown in Figure 4, the upper surface of the seat 107 is bored as shown to provide an annular chamber 121 surrounding the cylindrical stem 122 of the valve 108 and to provide a shoulder 123. The valve stem 122 is provided with two longitudinally extending, narrow tapered slots 124 which terminate just below the level of shoulder 123 when the head 125 of the valve is engaged with the upper face 126 of flange 117 of the seat. A central bore 127 in the valve communicates by ports 128 with annular chamber 121 when the valve is thus seated.

Suitable sealing rings 129 are provided as shown in Figure 2 to prevent undesired leakage of fluid from the valve.

With the parts in normal condition as in Figures 1 and 2, the control valve will provide a substantially free flow of fluid between the pressure line 20 and the exhaust line 24, since fluid will be free to pass by means of passages 88 around the lands 78 and 79 to the exhaust chambers and thence to the return line 24. However, movement of the valve plunger in either direction from neutral will either restrict or completely block this flow of fluid and will cause the fluid to be forced out of one or the other of the cylinder ports 48 or 49 to the corresponding end of the booster cylinder.

For example, if the plunger is moved slightly to the left, the passage 88 between cylinder chamber 46 and exhaust chamber 81 will be restricted and part at least of the fluid being delivered by the pump into chamber 82, will be diverted out through cylinder port 48 to the right hand end of the booster cylinder 13, causing the piston therein to move to the left to swing the control surface upwardly or in a clockwise direction about its pivot 11. The fluid displaced from the left hand end of cylinder 13 will be returned through conduit 23 and port 49 to chamber 47 and thence through passage 88 to exhaust chamber 83 for return to the reservoir. It should be remembered that the pressure that will obtain in cylinder chamber 46 under these conditions will be determined directly by the resistance to movement of the control surface. If the load on the control surface is low as would be true at low flight speeds, the pressure in chamber 46 will be low. Conversely at high speeds, with the resulting high loads on the control surface, the pressure in chamber 46 will be correspondingly higher.

It is obvious too that to maintain the control surface deflected against any particular air load, the pressure in chamber 46 must be maintained at a value to correspond to such airload. By holding the valve plunger displaced slightly to the left of neutral, the passage 88 between chamber 46 and exhaust chamber 81 can be so restricted that the pressure drop due to the flow of fluid therethrough will just equal the pressure needed to maintain the control surface deflected. Movement of the valve plunger further to the left from this balance position would cause further deflection of the control surface while movement back toward true neutral position would permit the control surface to move under the action of the airload to a position of less deflection.

Similar action would of course obtain if the valve plunger were moved to the right of neutral position, which would produce a deflection of the control surface in the opposite direction.

Movement of the control valve plunger in either direction is under the control of the manual control means 39 as modified by the action of the follow-up mechanism 31, 41.

Thus again assuming that it is desired to elevate the control surface 10, the pilot will pull the upper end of the manual control means rearwardly (to the left in Figure 1) which will produce a corresponding counterclockwise movement of lever 33 about its pivot 34. Pivot 32, mounting lever 31 thereon, will thus be swung to the left and since the control surface is at the present time assumed to be stationary and pivot 43 at the upper end of lever 31 will be held against movement by link 41, the lower end of lever 31 will swing to the left causing a corresponding movement of the plunger 27. As above set forth, this will cause actuation of the booster cylinder to swing the control surface upwardly about its pivot. Link 41 then will be pulled to the left by its connection to lever arm 12 and will cause a corresponding leftward movement of pivot 43 at the upper end of lever 31, producing a counter-clockwise movement of this lever about pivot 32 tending to return the plunger to its neutral position and requiring that the manual control means be pulled further to the left if further movement of the control surface is to be produced. While to simplify the explanation of this operation the various movements have been described as being sequential, actually they occur practically simultaneously, so that a steady movement of the manual control means will be accompanied by the corresponding steady movement of the control surface. When the movement of the manual control means is stopped, the control surface will likewise stop its movement and will remain in a position of deflection corresponding to the new position of the manual control means.

The manner in which the improved control valve produces the desired variable ratio "feel" reaction, on the manual control means, will now be explained.

With the linkage system involved, it can readily be seen that, if a force is applied to the control plunger 27 tending to oppose movement of the plunger from the neutral position, this force will be transmitted to the manual control means by the linkage as a proportional force that must be overcome by the pilot in order to move the manual control means. Thus, if the ratio of this force acting on the plunger to the load on the control surface can be made to vary with the load as outlined in the objects set forth at the beginning of this specification, it can be seen that the ratio of pilot effort to load on the control surface will similarly vary as desired, to give maximum percentage of boost at high control loads and minimum percentage of boost at low control loads.

Referring again to Figure 2, it will be seen that as long as variable orifice valve 108 remains closed, the pressure in feel chamber 80, 94 will be the same as that in cylinder chamber 46, which, as above set forth, will be directly proportional to the load on the control surface. This pressure will react against land 76 and will produce a force acting toward the right on the plunger and appearing as a "feel" reaction at the manual control means. Thus until the pressure in the booster cylinder, and consequently in the feel chamber, becomes sufficient to open valve 108, the feel reaction will be directly proportional to the load on the controls and within this range may represent perhaps 40 per cent of the actual force needed to operate the control surface.

If the load on the control surface increases above this range, however, the pressure in the feel chamber will also increase sufficiently to move valve 108 against the reaction of spring 109. As soon as the valve stem moves upwardly so that the upper ends of slots 124 pass the shoulder 123, flow of fluid through the slots will be permitted to an extent depending upon the cross section area of the slots at the level of the shoulder 123 at that particular time. Obviously this effective orifice area will vary smoothly from zero, when the valve is seated, to a maximum, when it is moved upwardly to the maximum extent permitted by the construction shown.

Since the fluid that flows through the orifice of valve 108 also must flow from the cylinder chamber 46 through the fixed orifice 96, there will be produced a pressure drop through the orifice 96. The pressure in chamber 94 (and of course in chamber 80) will therefore necessarily be less than the pressure in the cylinder chamber 46 by an amount equal to this pressure drop through the orifice. Since the pressure in the feel chamber 80 is now less than the pressure in the cylinder chamber, whereas before (when valve 108 was closed) it was the same, it is obvious that the ratio of feel pressure to booster cylinder pressure has decreased. By the same token, since the feel pressure is a measure of the feel reaction and the cylinder pressure is a measure of the load on the control surface, the ratio of feel reaction to load on the control surface, has been automatically decreased as was desired. For example, the feel reaction on the manual control means under the maximum control load conditions may represent only about 10 or 15 per cent of the total force needed to operate the controls under these conditions as compared with the 40 per cent feel reaction at low loads.

It should be noted, however, that while the ratio of feel reaction to control load has been decreased as compared with that of the previously discussed low load conditions, the actual value of feel reaction has been increased. This is necessarily true since only by an increase in pressure in the feel chamber can the variable orifice valve increase its effective orifice area to cause an increase in pressure drop through the fixed orifice. For example, in a particular installation, let it be assumed that the variable orifice valve is preloaded to just crack open at a pressure of about 68 p. s. i. in the feel chamber. Up to this value, the pressure in the cylinder chamber and that in the feel chamber will be the same. However, if the cylinder pressure rises to say 80 p. s. i., the feel pressure will rise to only about 77.5 p. s. i. At 150 p. s. i. pressure in the cylinder chamber, the feel pressure will be 102 p. s. i., at 300 p. s. i. in the cylinder chamber, the feel pressure will assume a value of 133 p. s. i., etc.

While in the above discussion, it has been assumed that the control means has been operated to cause upward swinging of the control surface, it is believed obvious that corresponding results would obtain if the control means were operated to depress the control surface. In such a case, the pressure in the right-hand feel chamber would control the amount of feel reaction on the manual control means, with the right-hand valve nut unit 105 effective to vary the ratio of feel reaction to load on the control surface in a corresponding manner.

While the invention is shown as applied to but one form of follow-up booster control system, it is believed obvious that it is equally applicable to other booster systems using other types of follow-up mechanism.

Similarly while a unitary control valve structure has been shown for providing the desired variable feel ratio, it is believed obvious that the structural arrangement of the elements could vary quite widely from that shown while still retaining the same principle of operation and without departing from the spirit and scope of the invention as defined by the appended claims.

I claim as my invention:

1. A booster control system for an airplane having a movable control surface, a power actuator for moving said control surface, manual control means movable from a neutral position to cause actuation of said power actuator, means for applying a force to said manual control means proportional to the load on said control surface and tending to return said manual control means to neutral position, and means for controlling said force applying means and responsive to the load on said control surface for decreasing the ratio of said force to said load as said load increases.

2. A booster control system for an airplane having a movable control surface, a power actuator for moving said control surface, manual control means movable from a neutral position to cause actuation of said power actuator, means for applying a force to said manual control means proportional to the load on said control surface and tending to return said manual control means to neutral position, and means for controlling said force applying means and responsive to the load on said control surface for maintaining the ratio of said force to said load substantially contant up to a predetermined value of load and for causing said ratio to decrease upon an increase in load above said predetermined value.

3. A booster control system for an airplane having a movable control surface and a fluid pressure actuator therefor, comprising a booster control valve, said control valve including a manually controlled element movable from neutral position to control the flow of fluid to said actuator, means forming a feel chamber within said valve, the pressure in said feel chamber acting upon said movable element so as to tend to return it to neutral position, means forming a fluid connection between said actuator and said feel pressure chamber and including a pressure reducing means, and means responsive to the load on said control surface for causing the pressure drop through said pressure reducing means to increase with an increase in control surface load.

4. A booster control system for an airplane having a movable control surface and a fluid pressure actuator therefor, comprising a booster control valve, said control valve including a manually controlled element movable from neutral position to control the flow of fluid to said actuator, means forming a feel chamber within said valve, the pressure in said feel chamber acting upon said movable element so as to tend to return it to neutral position, means forming a fluid connection between said actuator and said feel pressure chamber and including a pressure reducing means, and means responsive to the pressure in said feel chamber for causing the pressure drop through said pressure reducing means to increase with an increase in control surface load.

5. A booster control valve for use in a fluid pressure control system including a fluid pressure actuator, comprising a valve body provided with a bore, a control element movable in said bore and having means cooperating with said body to provide an exhaust chamber, a pressure chamber, a cylinder chamber and a feel pressure chamber, said cylinder chamber being adapted for connection to said actuator, said control element being movable from neutral position to connect said pressure chamber with said cylinder chamber, means forming a passageway connecting said cylinder chamber and said exhaust chamber and including a restricted orifice, a variable orifice pressure responsive valve located in said passageway between said restricted orifice and said exhaust chamber and normally preventing flow of fluid through said passageway, said feel pressure chamber communicating with said passageway at a point between said restricted orifice and said variable orifice valve, said variable orifice valve being operable responsive to the pressure in said feel chamber to cause opening of its variable orifice to a predetermined extent in relation to said pressure, the pressure in said feel chamber acting against said movable element and tending to return it to neutral position.

6. In a booster control system for airplanes, a movable control surface, a fluid pressure actuator connected thereto, a source of fluid pressure, means connecting said source to said actuator and including a booster control valve having an element movable from neutral position for controlling the flow of fluid to said actuator, manual means for moving said element, and means responsive to the pressure in said actuator for applying a force to said movable element tending to return said movable element to neutral position and including means controlled by said pressure for increasing said force with an increase in pressure in said actuator but at a lower relative rate.

7. In a booster control system for an airplane having a movable control surface, a fluid pressure actuator therefor, a fluid supply system including pressure and exhaust lines, a booster control valve, manually controlled means movable from a neutral position to cause said valve to supply fluid from said pressure line to said actuator, said valve including a cylinder chamber, in communication with said actuator, and a feel pressure chamber, means forming a restricted orifice between said feel charmer and said cylinder chamber, means forming a passageway from said feel chamber to said exhaust line, a pressure responsive variable orifice valve in said passageway, controlling flow of fluid through said passageway and through said restricted orifice in accordance with the pressure in said feel chamber, whereby the pressure in said feel chamber will be equal to the pressure in said cylinder chamber minus the pressure drop due to flow through said fixed orifice, and means responsive to the pressure in said feel pressure chamber for applying a force tending to return said manually controlled means to neutral position.

8. In a booster control system for an airplane having a movable control surface, a fluid pressure actuator therefor, a fluid supply system including pressure and exhaust lines, a booster control valve, manually controlled means movable from a neutral position to cause said valve to supply fluid from said pressure line to said actuator, said valve including a cylinder chamber, in communication with said actuator, and a feel pressure chamber, means forming a restricted orifice between said feel chamber and said cylinder chamber, means forming a passageway from said feel chamber to said exhaust line, a pressure responsive variable orifice valve in said passageway, controlling flow of fluid through said passageway and through said restricted orifice in accordance with the pressure in said feel chamber, whereby the pressure in said feel chamber will be equal to the pressure in said cylinder chamber minus the pressure drop due to flow through said fixed orifice, means for preloading said variable orifice valve whereby flow of fluid through said passageway will be prevented until the pressure in said feel chamber reaches a predetermined value, and means responsive to the pressure in said feel pressure chamber for applying a force tending to return said manually controlled means to neutral position.

9. In a booster control system for an airplane having a movable control surface, a fluid pressure actuator therefor, a fluid supply system including pressure and exhaust lines, a booster control valve, manually controlled means movable from a neutral position to cause said valve to supply fluid from said pressure line to said actuator, said valve including a cylinder chamber, in communication with said actuator, and a feel pressure chamber, means forming a restricted orifice between said feel chamber and said cylinder chamber, means forming a passageway from said feel chamber to said exhaust line, a pressure responsive variable orifice valve in said passageway, controlling flow of fluid through said passageway and through said restricted orifice in accordance with the pressure in said feel chamber, whereby the pressure in said feel chamber will be equal to the pressure in said cylinder chamber minus the pressure drop due to flow through said fixed orifice, said variable orifice valve being so constructed as to increase its effective orifice area as the pressure in said feel pressure chamber increases, and means responsive to the pressure in said feel pressure chamber for applying a force tending to return said manually controlled means to neutral position.

10. In a booster control system for an airplane having a movable control surface, a fluid pressure actuator therefor, a fluid supply system including pressure and exhaust lines, a booster control valve, manually controlled means movable from a neutral position to cause said valve to supply fluid from said pressure line to said actuator, said valve including a cylinder chamber, in communication with said actuator, and a feel pressure chamber, means forming a restricted orifice between said feel chamber and said cylinder chamber, means forming a passageway from said feel chamber to said exhaust line, a pressure responsive variable orifice valve in said passageway, controlling flow of fluid through said passageway in accordance with the pressure in said feel chamber, whereby the pressure in said feel chamber will be equal to the pressure in said cylinder chamber minus the pressure drop due to flow through said fixed orifice, said variable orifice valve being so constructed as to increase its effective orifice area as the pressure in said feel pressure chamber increases, means for preloading said variable orifice valve whereby flow of fluid through said passageway will be prevented until the pressure in said feel chamber reaches a predetermined value, and means responsive to the pressure in said feel pressure chamber for applying a force tending to return said manually controlled means to neutral position.

11. A booster control system for an airplane having a movable control surface and a fluid pressure actuator therefor, comprising a booster control valve, said control valve including a manually controlled element movable from a neutral position to control the flow of fluid to said actuator, means forming a feel pressure chamber, the pressure therein acting upon said movable element so as to tend to return it to neutral position, means forming a fluid connection between said actuator and said feel pressure chamber and including a pressure reducing means, and means responsive to the load on said control surface for varying the pressure drop through said pressure reducing means in accordance with variations in said load.

THOMAS C. HILL.

REFERENCES CITED

The following references are of record in the file of this patent:

UNITED STATES PATENTS

| Number | Name | Date |
| --- | --- | --- |
| 1,766,481 | Bragg et al. | June 24, 1930 |
| 2,345,531 | De Ganahl | Mar. 28, 1944 |
| 2,380,705 | Proctor | July 31, 1945 |